June 3, 1952  S. M. MARCO ET AL  2,598,812
ELECTRICALLY ACTUATED WEIGHING SCALE
Filed March 20, 1947  3 Sheets-Sheet 1
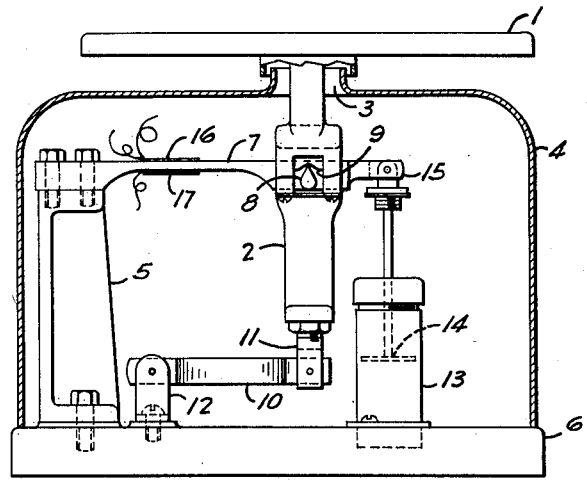
Fig. I
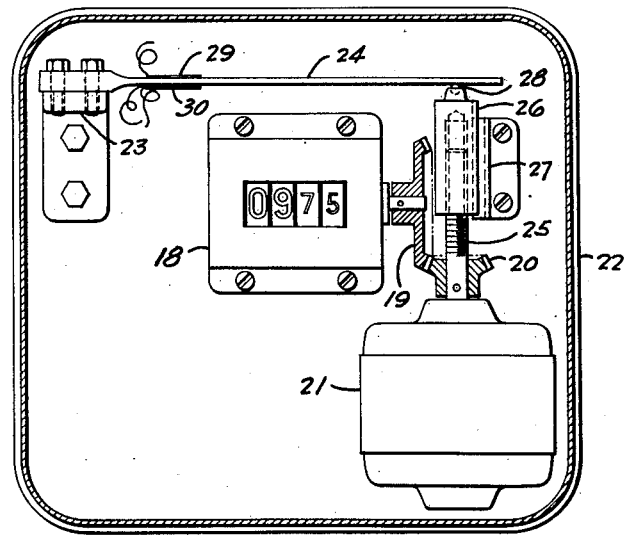
Fig. II
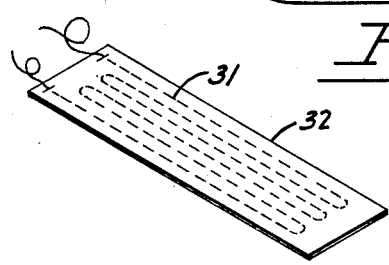
Fig. III
Salvatore M. Marco
Wells L. Davis
INVENTORS
BY
Marshall and Marshall
ATTORNEYS

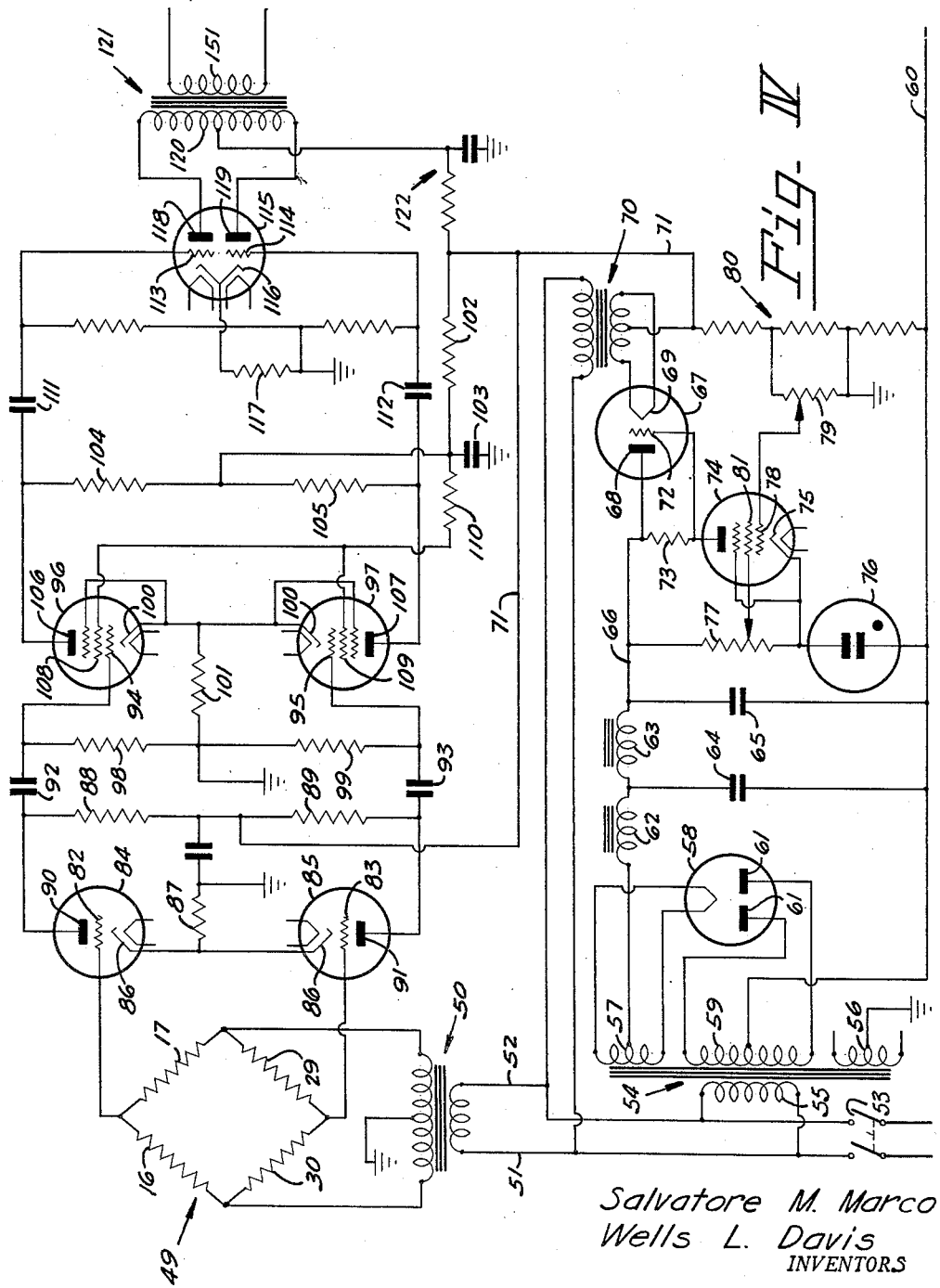
Fig. IV

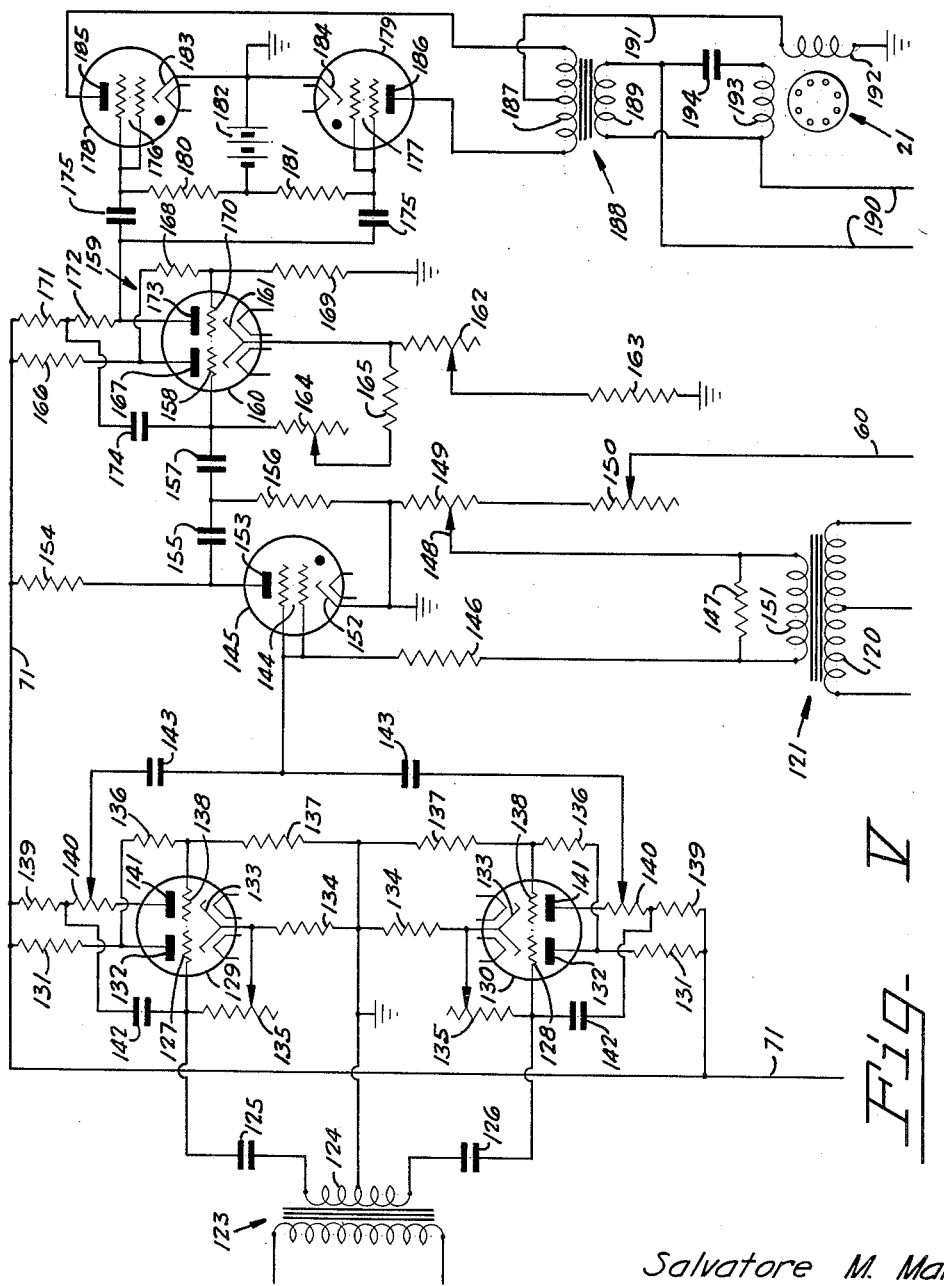

Patented June 3, 1952

2,598,812

UNITED STATES PATENT OFFICE 2,598,812

ELECTRICALLY ACTUATED WEIGHING SCALE

Salvatore M. Marco and Wells L. Davis, Columbus, Ohio, assignors to Toledo Scale Company, Toledo, Ohio, a corporation of New Jersey Application March 20, 1947, Serial No. 735,890

3 Claims. (Cl. 265—27)

1

This invention relates to weighing scales and in particular to improved means for indicating the deflection of a spring that is subjected to load forces.

Many weighing scales are used under conditions that require that the weight indication be available very quickly after the application of load. The factors that prevent rapid indication of load include the inertia of the indicator or chart, the inertia of the lever system, and the restriction of a dashpot that is used to suppress continued oscillation of the indicator. The effect of inertia on the speed of response of a weighing scale may be reduced by decreasing the travel of the indicator and lever system. However, any decrease in indicator travel makes the scale more difficult to read because it decreases the spread of the graduations. If the deflection of the weighing spring or the travel of the lever system is reduced and motion multiplying mechanism is included between the lever system and the indicator, the effect of the inertia of the indicator is increased so that no material decrease in time of response is attained.

The principal object of this invention is to provide a weighing scale in which the travel of the load receiver and the deformation of the load counterbalancing spring or springs is kept very small and in which the small deflection is magnified to a usable indicator travel without applying inertia force to the weighing spring.

Another object of the invention is to provide a weighing scale in which the indicating portion may be separated from the load receiver without adversely affecting the accuracy or speed of response of the weighing system.

A still further object of the invention is to electrically measure the deformation of a load supporting spring and to electrically drive an indicator or indicating device to a position that corresponds to the deformation of the load supporting spring.

These and other objects and advantages are apparent from the following description in which reference is made to the accompanying drawings.

According to the invention a load receiver is supported on an elastically deformable member, the deformation of the elastic member is measured electrically and a second member that includes electrical elements is adjusted by means of a motor so that a bridge circuit including the deformation measuring elements is maintained in a condition of balance and an indicator or indicating mechanism driven by the motor continuously indicates the deformation of the load

2 supporting member. By measuring the deformation of the load supporting member by sensitive electrical means, the actual deformation of the member may be kept to small limits so that the inertia forces of the supported mass do not influence the speed of response of the weighing scale. Furthermore, by utilizing electrical forces to drive the indicating mechanism the friction in the indicating mechanism does not reduce the accuracy of indication. The electrical drive to the indicating mechanism also makes possible the use of a counter or other figure displaying indicator in lieu of the conventional light weight indicator pointer that cooperates with a stationary chart.

An improved weighing scale constructed according to the invention is illustrated in the accompanying drawings.

In the drawings:

Figure I is an elevation, partly in section, of a small weighing scale constructed according to the invention.

Figure II is a plan view with parts shown in section of the indicating portion of the weighing scale.

Figure III is a perspective view of an electrical element suitable for use in measuring the deformation of the load supporting spring.

Figures IV and V are schematic wiring diagrams of the electrical portions of the improved weighing scale in which Figure IV shows the amplifier portion and Figure V the motor control portion of the electrical circuits.

These specific drawings and the accompanying description are intended merely to illustrate the invention but not to impose limitations on the claims.

In the improved weighing scale a load receiver 1 is supported on a spider 2 that extends upwardly through an opening 3 of a housing 4. A pedestal 5 erected from a base 6 extends upwardly within the housing 4 and at its upper end carries a horizontal cantilever beam 7. The cantilever beam 7 is provided with spaced upwardly directed knife edges 8 that cooperate with V bearings 9 mounted in the spider 2 to support the spider 2 and the load receiver 1. A check link 10 pivotally connected to a stem 11 depending from the spider 2 and to a bracket 12 erected from the base 6 prevents any tipping or swinging motion of the load receiver 1. A dashpot 13 having a plunger 14 pivotally connected to an extension 15 of the cantilever beam 7 suppresses vibratory motion of the load receiver 1 following changes in load.

The cantilever beam 7 is reduced in section throughout a portion of its length such that the major deformation of the beam in response to loads on the load receiver take place within the reduced section. In this way much more rigid connections between the beam 7 and the pedestal 5 may be maintained.

A pair of resistance wire strain gauges 16 and 17 attached to the upper and lower surfaces of the cantilever beam 7 at the region of maximum bending moment serve as electrical elements or means that have impedances that vary according to the deflection of the cantilever beam 7 which serves as a resilient member for supporting the load receiver 1.

The indicating portion of the improved weighing scale, which may be located either adjacent to the load receiver portion or at some remote location, includes a counter 18 that is connected through bevel gears 19 and 20 to a motor 21. The counter 18 and the motor 21 are mounted on a base 22. Also erected from the base 22 is a bracket 23 to which one end of a thin cantilever beam 24 is securely attached. An extension 25 of the armature shaft of the motor 21 threadedly engages a nut 26 that is guided and prevented from rotating by a guide 27 supported from the base 22. The nut 26 terminates in a transverse semicylindrical tip 28 that bears against the free end of the beam 24 and serves to deflect the beam 24 by an amount corresponding to the rotation of the motor 21. Resistance wire strain gauges 29 and 30 attached to the cantilever beam 24 near its fixed end serve as electrical means by which the deformation of the cantilever beam 24 may be measured.

Figure III shows one of the resistance wire strain gauges before it is applied to one of the cantilever beams 7 or 24. The resistance wire strain gauge consists of a filament or fine resistance wire 31 that is looped back and forth and cemented to a backing strip 32 of paper or other insulating material. The resistance wire strain gauges are attached to the stressed surfaces of the cantilever beams by use of any cement or adhesive that hardens to a film that is sufficiently hard to transmit the deformation of the surface to the resistance wire filaments.

Referring to Figure IV, the resistance wire elements 16 and 17 attached to the cantilever beam 7 constitute two arms of a bridge circuit 49 while the resistance wire elements 29 and 30 that are attached to the receiver cantilever beam 24 constitute the other two arms of the bridge circuit. The bridge circuit 49 is energized through a step-down transformer 50, the secondary of which is center tapped and grounded. The primary of the transformer 50 is connected through leads 51 and 52 and a disconnect switch 53 to a source of alternating current power.

A power transformer 54 has its primary 55 connected to the leads 51 and 52. The transformer 54 has a filament winding 56 that supplies power for the filaments of the electronic tubes employed in the amplifier. A rectifier filament winding 57 supplies power to the filament of a rectifier tube 58. A center tapped high voltage winding 59 of the power transformer 54 has its center tap connected to a negative return lead 60 and its ends connected to plates 61 of the rectifier tube 58. The center tap of the rectifier filament winding 57 is connected through a filter comprising chokes 62 and 63 and condensers 64 and 65 to a lead 66 constituting the input to an electronic voltage regulator circuit.

The electronic voltage regulator includes an electronic tube 67 having a plate 68 connected to the lead 66 and having a filament 69 that, serving as a cathode, is connected through the secondary of a filament transformer 70 to a lead 71 that serves as the regulated high voltage lead or B+ lead for the amplifier. The tube 67 is, in effect, connected in series between the filter and the lead. The voltage drop across the series tube 67 is continuously adjusted to accommodate any changes in voltage occurring at the output of the filter and thus maintain a constant voltage between the leads 60 and 71. The voltage drop across the series tube 67 is controlled by adjusting the potential of its grid 72 with respect to its filament 69. The potential of the grid 72 is controlled by the current flow through a resistor 73 serving as the plate resistor for an amplifier tube 74. A cathode 75 of the amplifier tube 74 is maintained at a substantially constant potential with respect to the negative return lead 60 by means of a constant potential glow discharge tube 76 to which current is supplied through a resistor 77 connected to the rectifier output lead 66. The amplifier tube 74 has its grid 78 connected to a potentiometer 79 that forms part of a voltage divider 80 connected between the regulated output lead 71 and the negative return lead 60. The amplifier tube 74 has its screen grid 81 connected to the resistor 77 at a point sufficiently positive with respect to the cathode 75 of the tube to supply appropriate screen voltage.

This circuit arrangement serves to stabilize the voltage between the positive output voltage lead 71 and the negative return lead 60 because any increase in this voltage causes a positive increment of voltage to be applied between the grid 78 and cathode 75 of the amplifier tube 74 with the result that the amplifier tube 74 draws slightly greater plate current which, by increasing the voltage drop across the plate resistor 73, decreases the potential of the grid 72 of the series tube 67 so that a greater voltage drop occurs across this tube thereby canceling the assumed positive increase of voltage at the regulator output. Any decrease in voltage between the leads 71 and 60 acts through the amplifier tube 74 to decrease the voltage drop across the series tube 67 and thus correct the deficiency in voltage at the output of the regulator.

Changes in voltage at the output of the rectifier filter are partially compensated because an increase in rectifier output voltage by increasing the voltage drop across the resistor 77 increases the screen voltage of the amplifier tube 74 which has the effect of increasing the plate current through the tube and thereby decreasing the potential of the grid 72 of the series tube 67 so that its voltage drop is increased in nearly the same amount as the output voltage of the rectifier filter was increased.

The bridge circuit 49, the arms of which consist of the resistance wire elements attached to the cantilever beams, is energized from the transformer 50 and has its other diagonal connected directly to grids 82 and 83 of amplifier tubes 84 and 85 respectively. Cathodes 86 of the amplifier tubes are connected together and are connected through a cathode resistor 87 to ground. Plate current for the amplifier tubes 84 and 85 is supplied through plate resistors 88 and 89 that are connected between the output lead 71 of the electronic voltage regulator and plates 90 and 91 of the amplifier tubes 84 and 85. Because of the symmetry of the bridge circuit 49 unbalance of the bridge causes substantially equal and opposite voltages to be applied to the amplifier tube grids 82 and 83 with the result that the changes in plate current in the amplifier tubes are substantially equal and opposite and thus there is no signal voltage drop in the cathode resistor 87. Changes in filament temperature in the amplifier tubes or changes in voltage of the regulator output lead 71 do not introduce appreciable interference with the amplified signal because such currents are in phase and, therefore, flow through the cathode resistor 87 which provides sufficient de-generation to materially decrease the amplification of this spurious voltage.

The output voltage of the amplifier tubes 84 and 85 is transmitted through coupling condensers 92 and 93 to grids 94 and 95 of amplifier tubes 96 and 97. The grids 94 and 95 are connected to ground through grid resistors 98 and 99. Cathodes 100 of the amplifier tubes 96 and 97 are connected together and are connected through a cathode resistor 101 to ground. Plate voltage for this stage of the amplifier is applied through a resistance-capacitance filter including a resistor 102 and a condenser 103. Plate resistors 104 and 105 are connected between the resistance-capacitance filter and plates 106 and 107 of the second stage amplifier tubes 96 and 97. Screen grids 108 and 109 of the amplifier tubes 96 and 97 are connected together and through a common screen resistor 110 to the resistance-capacitance filter. The use of a common screen resistor 110 and a common cathode resistor 101 introduces de-generation to reduce the response of the amplifier to in-phase signals without affecting its sensitivity and amplification of the desired out-of-phase signals.

The output voltages of the second stage amplifier tubes 96 and 97 are transmitted through coupling condensers 111 and 112 to grids 113 and 114 of a dual triode third stage amplifier tube 115. A cathode 116 of the dual triode amplifier tube 115 is connected through a cathode resistor 117 to ground. Plates 118 and 119 are connected to the ends of a primary winding 120 of an interstage transformer 121. A center tap of the primary winding 120 is connected through a resistance-capacitance filter 122 to the regulated voltage output lead 71.

This amplifier serves to amplify the small voltages occurring across the arms of the resistance wire bridge into voltages that are usable in a motor control circuit. The amplifier is characterized by being sensitive to voltages resulting from unbalance of the bridge and by being relatively free from output voltage changes resulting from changes in cathode temperature of the amplifier tubes or changes in supply voltage.

The motor control circuit provides that, for any output voltage of the amplifier over an adjustable minimum, full driving current is supplied to the motor 21 serving to deflect the receiver beam 24 in a direction to rebalance the bridge and that a sufficiently large direct current component for dynamic braking is included in the motor current so that the motor stops quickly without objectionable oscillations upon reaching a condition of balance. The winding of one phase of the motor is energized through grid controlled gaseous discharge tubes, the conducting periods of which are determined by a synchronizing signal and the presence or absence of an amplifier output signal. The phase of the amplifier signal, which changes by 180° when the direction of bridge unbalance reverses, determines which discharge tube conducts and, therefore, the direction of motor rotation. Referring to Figure V alternating current power is supplied through a transformer 123 that has a center tapped secondary 124 the center tap of which is grounded and the ends of which are connected through condensers 125 and 126 to grids 127 and 128 of a pair of dual triodes 129 and 130 that are connected as multivibrators.

The multivibrator circuits including the dual triode tubes 129 and 130 are exact duplicates except for being synchronized 180° apart by connection to opposite ends of the secondary 124 of the transformer 123. A description of one, therefore, suffices for both.

In each of the multivibrator circuits current normally flows through a plate resistor 131 and plate 132 to a cathode 133 of the tube and then through a cathode resistor 134 to ground. When current is flowing through this path the potential of the grid 127 (or 128) with respect to the cathode 133 is substantially zero. The grid 127 (or 128) is connected to the cathode 133 through an adjustable resistor 135. The plate 132 is also connected through a voltage divider comprising resistors 136 and 137 to a grid 138 of the other section of the dual triode tube 129 (or 130). If a negative increment of voltage is impressed on the grid 127, the plate current through that section of the tube is correspondingly decreased so that its plate potential rises. The increase in plate potential is transmitted through the voltage divider 136, 137 to the grid 138 so that the other section of the tube draws a positive increment of plate current. This increment of plate current flows through a plate resistor 139, an output control 140 and a plate 141 of the tube.

The voltage drop across the resistor 139, resulting from this positive increment of plate current, is transmitted through a coupling condenser 142 to the grid 127 (or 128) to increase the negative increment of voltage that initiated the series of changes in potentials and currents. These changes in potentials and currents are cumulative and terminate with the current flow through the plate 132 completely cut off and full current flow through the plate 141. Under this condition the condenser 142 discharges through the adjustable resistor 135 until the potential of the grid 127 (or 128) raises sufficiently to permit current flow between the plate 132 and the cathode 133. This current flow initiates a sequence of changes that results in transferring conduction back to the first side of the dual triode tube 129 (or 130). The output of each multivibrator consists of negative impulses of rectangular wave shape in which the timing of the leading edge of the negative voltage impulse is controlled by the signal voltage from the transformer 123 while the duration of the negative impulse is controlled by the setting of the adjustable resistor 135.

The outputs of the multivibrators are connected through small coupling capacitors 143 to grids 144 of a grid controlled gaseous discharge tube 145. The grids 144 are also connected through resistors 146 and 147 to an adjustable connection 148 of a potentiometer 149. One end of the potentiometer 149 is grounded. The other end of the potentiometer 149 is connected through an adjustable resistance 150 to the negative return lead 60 of the electronically regulated power supply. The time constant of the coupling condensers 143 and the resistors 146 and 147 is sufficiently short in comparison with the frequency of oscillation of the multivibrators that the substantially rectangular wave form of the multivibrator output is converted into sharp triangular impulses of voltage. The impulses are negative when the multivibrators are tripped by the synchronizing signals from the capacitors 143 and are positive when the plate current transfers from the plates 141 to the plates 132.

The secondary 151 of the interstage transformer 121, that is connected to the amplifier, is connected across the resistor 147 so that a signal to the grid controlled gaseous discharge tube 145 consists of the voltage impulses from the multivibrators added to the output signal of the amplifier. The potentiometer 149 is adjusted so that the voltage impulses from the multivibrator only are not quite sufficient to cause current to flow in the discharge tube 145. The gaseous discharge tube 145 has its cathode 152 connected directly to ground and its plate 153 connected through a high resistance 154 to the regulated voltage lead 71. A condenser 155 and a resistor 156 are connected in series between the plate 153 and the cathode 152 of the gaseous discharge tube. When no current flows through the tube the condenser 155 charges to the potential of the regulated voltage on the lead 71. As soon as the gaseous discharge tube is tripped, i. e. rendered conducting, by a combination of signals from the multivibrator and the amplifier, it discharges the condenser 155 and in so doing impresses through a condenser 157 a negative voltage on a grid 158 of a timing multivibrator 159.

The multivibrator 159 is substantially similar to the multivibrators just described. It consists of a dual triode tube 160 having a cathode 161 connected through an adjustable resistor 162 and a fixed resistor 163 to ground. The grid 158 is connected through an adjustable resistor 164 and a fixed resistor 165 to the cathode 161 of the tube. Normally plate current flows from the regulated high voltage lead 71 through a plate resistor 166, a plate 167 past the grid 158 and through the cathode 161 and the resistors 162, 163 to ground. When a negative voltage is impressed on the grid 158 to decrease the current flow through this path a positive increment of voltage is applied through a voltage divider consisting of resistors 168 and 169 to a grid 170 of the dual triode tube 160. This positive increment of voltage at the grid 170 causes current to flow through plate resistors 171 and 172 and a plate 173 of the tube 160 past the grid 170 and through the cathode 161 and cathode resistors to ground. The negative increment of voltage produced by the increased current flow from the plate resistor is transmitted through a condenser 174 to the grid 158 where it augments the negative increment of voltage that was transmitted to that grid through the condenser 157 from the gaseous discharge tube 145. After the condenser 174 charges through the resistors 164 and 165 current again flows through the plate 167 and current through the plate 173 is cut off.

The output of the multivibrator 159 is connected through small coupling capacitors 175 to grids 176 and 177 of thyratrons 178 and 179. The thyratron grids 176 and 177 are connected respectively through grid resistors 180 and 181 to the negative end of a battery 172 that serves to supply grid bias for the thyratrons. The positive end of the battery 182 and cathodes 183 and 184 of the thyratrons 178 and 179 are connected together and to ground. Plates 185 and 186 of the thyratrons are connected to the ends of a secondary winding 187 of a plate transformer 188. The transformer 188 has a primary winding 189 that is connected through leads 190 to a source of alternating current power. The center tap of the secondary 187 of the transformer 188 is connected through a lead 191 to one winding 192 of the two phase motor 21 that serves to deflect the receiver beam 24. The other end of the winding 192 is grounded. The other winding 193 has one end connected directly to one of the power leads 190 and the other end connected through a condenser 194 to the other of the power leads 190.

As long as the amplifier output signal is zero or less than a certain minimum value, the gaseous discharge tube 145 is not tripped and the multivibrator 159 does not operate. Sufficient bias is maintained on the thyratrons 178 and 179 so that under this condition they are not tripped and therefore do not pass plate current. As soon as sufficient amplifier signal is present to combine with the output of the multivibrators the gaseous discharge tube 145 is tripped and the multivibrator 159 goes through its cycle of operation. The resulting output signal of the multivibrator 159 consists of, first, a negative impulse at the grids of the thyratron tubes which produces no result and then a positive impulse that trips whichever of the thyratrons is connected to the then positive end of the secondary winding 187 of the transformer 188. Current flow through the tripped thyratron also flows through the winding 192 so that that phase winding cooperates with the continuously energized phase winding 193 to produce rotation of the motor 21. The timing of the thyratron current flow as determined by direction of bridge unbalance and multivibrator adjustments controls the speed and direction of rotation of the motor.

It is necessary for satisfactory operation of the motor 21 that a reasonably exact proportion of direct to alternating current shall flow through the winding 192. This ratio of direct to alternating current can be controlled by controlling the exact time at which the thyratrons 178 or 179 are rendered conducting by grid signal. This timing of the thyratrons is controlled by adjustment of the adjustable resistors 162 or 164, the resistor 164 having the greater effect. Since the multivibrator 159 merely measures off an interval of time after the discharge of the gaseous discharge tube 145, it is also necessary that that discharge be precisely timed. The two multivibrators that are synchronized with the alternating current supply by means of the transformer 123 provide the exact timing of the discharge of the discharge tube 145 that is necessary for operation of the motor. The adjustable resistors 135 in the grid circuits of these multivibrators allow the timing to be varied to secure whatever adjustment is required.

This motor control circuit has the advantage that full torque is maintained on the motor until the balance conditions of the bridge are completely satisfied and that as long as the bridge is balanced, current flow through the motor is kept to a minimum to avoid unnecessary power loss and heating.

The improved weighing scale provides exceptionally high speed response to changes in load because of the extremely slight movement of the load receiver and lever system, if one is used, and because the power to drive the indicating mechanism is derived from an external source other than the force of the load on the load receiver. Since the indicating mechanism is connected only electrically to the load receiver and load counterbalancing mechanism, the indicating mechanism may be located in any position convenient to the operator without regard for the location of the load receiver. The feature of using a motor to drive an indicating and measuring mechanism which measures the deflection of a load supporting spring permits the mechanism to be used to drive auxiliary devices without detracting from the accuracy or speed of weighing of the improved weighing scale.

Having described the invention, we claim:

1. In an automatic weighing scale, in combination, a support, a cantilever spring extending horizontally from the support, a load receiver pivotally supported from the free end of the spring, a pair of resistance wire strain gauges attached one to the upper surface and one to the lower surface of the cantilever spring, a second support, a second cantilever spring attached to the second support, a motor and driven mechanism for deflecting the free end of the second spring, a pair of resistance wire strain gauges mounted one on the upper surface and one on the lower surface of the second spring, said pairs of strain gauges being connected and energized as a bridge circuit, an amplifier responsive to unbalance voltage of the bridge circuit for driving the motor of the motor driven mechanism to keep the bridge circuit balanced, and means for indicating the revolutions of the motor as a measure of load.

2. In an automatic weighing scale, in combination, a support, a cantilever spring extending horizontally from the support, a load receiver pivotally supported from the free end of the spring, said spring being reduced in depth throughout a portion of its length, a pair of resistance wire strain gauges attached to the upper and lower surfaces of the reduced depth portion of the spring, a second support, a second cantilever spring attached to the second support, a motor arranged to deflect the end of the second spring, a pair of resistance wire gauges attached to the second spring, said two pairs of resistance gauges being connected and energized as a bridge circuit, an amplifier responsive to the unbalance voltage of the bridge circuit for driving the motor, and a counter driven by the motor for indicating the magnitude of the load.

3. In an automatic weighing scale, in combination, a support, a cantilever spring extending horizontally from the support, a load receiver pivotally supported from the free end of the spring, a pair of resistance wire strain gauges attached one to the upper surface and one to the lower surface of the spring, a second support, a second cantilever spring carried on the second support, a motor, a traveling nut mounted on the motor shaft and operatively engaging the free end of the second spring for deflecting the spring according to the revolutions of the motor, a second pair of resistance wire strain gauges that are attached to stressed surfaces of the second spring, said pairs of gauges being connected as a bridge circuit, an amplifier responsive to unbalance voltage in the bridge circuit for driving the motor in a direction to reduce the unbalance, and means for indicating the revolutions of the motor as an indication of load.

SALVATORE M. MARCO.
WELLS L. DAVIS.

REFERENCES CITED

The following references are of record in the file of this patent:

UNITED STATES PATENTS

| Number | Name | Date |
|---|---|---|
| 1,233,124 | Powers | July 10, 1917 |
| 2,180,175 | Silvertsen | Nov. 14, 1939 |
| 2,276,816 | Bagno | Mar. 17, 1942 |
| 2,344,642 | Ruge | Mar. 21, 1944 |
| 2,423,867 | Zener at al. | July 15, 1947 |
| 2,439,146 | Ruge | Apr. 6, 1948 |

OTHER REFERENCES

Publication: "Resistance Wire Strain Gage Equipment for Static and Dynamic Testing" by W. F. Gunning et al.; pgs. 608–613, of Product Engineering Sept. 1945.